United States Patent
Uenal et al.

(10) Patent No.: US 12,407,016 B2
(45) Date of Patent: Sep. 2, 2025

(54) SULFIDE SOLID ELECTROLYTE FOR SOLID-STATE BATTERIES AND METHOD FOR PRODUCTION

(71) Applicant: Mercedes-Benz Group AG, Stuttgart (DE)

(72) Inventors: Mahir Uenal, Stuttgart (DE); Hansen Chang, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/857,410

(22) PCT Filed: Jan. 9, 2024

(86) PCT No.: PCT/EP2024/050365
§ 371 (c)(1),
(2) Date: Oct. 16, 2024

(87) PCT Pub. No.: WO2024/170167
PCT Pub. Date: Aug. 22, 2024

(65) Prior Publication Data
US 2025/0125409 A1 Apr. 17, 2025

(30) Foreign Application Priority Data

Feb. 17, 2023 (DE) ............ 10 2023 000 539.8

(51) Int. Cl.
*H01M 10/0562* (2010.01)
*C01G 30/00* (2006.01)
(Continued)

(52) U.S. Cl.
CPC ...... *H01M 10/0562* (2013.01); *C01G 30/008* (2013.01); *H01M 4/0471* (2013.01);
(Continued)

(58) Field of Classification Search
CPC ............ H01M 4/0471; H01M 10/0562; C01P 2004/60; C01G 30/008
See application file for complete search history.

(56) References Cited

U.S. PATENT DOCUMENTS 8,075,865 B2 * 12/2011 Deiseroth ......... H01M 10/0562
423/511
2021/0075056 A1 3/2021 Nakata et al.
(Continued)

FOREIGN PATENT DOCUMENTS

CN 108352567 A 7/2018
CN 108475817 A 8/2018
(Continued)

OTHER PUBLICATIONS

Zhou et al, "New Family of Argyrodite Thioantimonate Lithium Superionic Conductors", Journal of the American Chemical Society 2019, 141, 19002-190013 (Year: 2019).*
(Continued)

*Primary Examiner* — Basia A Ridley
*Assistant Examiner* — Jonathan William Estes
(74) *Attorney, Agent, or Firm* — Crowell & Moring LLP

(57) ABSTRACT

A solid electrolyte for solid-state batteries comprises a phosphorous-free solid electrolyte having a cubic argyrodite structure. The solid electrolyte has a composition according to the molecular formula: $Li_{6+x}M_xSb_{1-y}S_{5-z}R$, where x=0 to 0.7; y=0 to 0.7 and z=0 to 0.7, wherein the (semi-) metal comprises M=Si, Sn, W and the halogen comprises R=$I_1$, $Cl_1$, $Br_2$, $Br_1$ and further wherein, in a case where R=$I_1$, M=W and x>0. Furthermore, a production method is described.

4 Claims, 1 Drawing Sheet

| | | $Li_2S$ | $Sb_2S_3$ | $SiS_2$ | LiCl |
|---|---|---|---|---|---|
| $Li_{6+x}Sb_{1-y}Si_xS_5Cl_1$ | X=0 | 1.181 | 1.456 | 0 | 0.363 |
| | X=0.1 | 1.22 | 1.331 | 0.08 | 0.369 |
| where x = y | X=0.3 | 1.301 | 1.069 | 0.249 | 0.381 |
| | X=0.5 | 1.389 | 0.789 | 0.429 | 0.394 |
| | X=0.6 | 1.434 | 0.642 | 0.523 | 0.401 |

| | | $Li_2S$ | $Sb_2S_3$ | $SiS_2$ | LiBr |
|---|---|---|---|---|---|
| $Li_{6+x}Sb_{1-y}Si_xS_5Br_1$ | X=0 | 1.084 | 1.292 | 0 | 0.66 |
| | X=0.1 | 1.081 | 1.179 | 0.071 | 0.67 |
| where x = y | X=0.3 | 1.15 | 0.94 | 0.219 | 0.689 |
| | X=0.5 | 1.22 | 0.694 | 0.377 | 0.71 |
| | X=0.6 | 1.257 | 0.563 | 0.459 | 0.87 |

(51) Int. Cl.
  *H01M 4/04* (2006.01)
  *H01M 4/02* (2006.01)
(52) U.S. Cl.
  CPC ... *C01P 2004/60* (2013.01); *H01M 2004/021* (2013.01); *H01M 2300/008* (2013.01)

(56) References Cited

U.S. PATENT DOCUMENTS

| | | |
|---|---|---|
| 2021/0296707 A1 | 9/2021 | Hayashi et al. |
| 2022/0166056 A1* | 5/2022 | Kim .................. H01M 10/0562 |
| 2022/0181676 A1* | 6/2022 | Song .................. H01M 10/0562 |
| 2022/0223909 A1 | 7/2022 | Zhou et al. |
| 2022/0255126 A1* | 8/2022 | Wu .................. H01M 10/0525 |
| 2024/0047734 A1* | 2/2024 | Li .......................... H01M 4/62 |

FOREIGN PATENT DOCUMENTS

| | | | |
|---|---|---|---|
| CN | 110431643 A | 11/2019 | |
| CN | 111092262 A | 5/2020 | |
| CN | 114269686 A | 4/2022 | |
| CN | 114466821 A | 5/2022 | |
| EP | 3 349 289 A1 | 7/2018 | |
| EP | 4 084 181 A1 | 11/2022 | |
| JP | 2022-157525 A | 10/2022 | |
| KR | 2021-0141012 A | 11/2021 | |
| WO | WO 2021/013824 A1 | 1/2021 | |
| WO | WO-2022094412 A1 * | 5/2022 | ........ H01M 10/0468 |

OTHER PUBLICATIONS

International Search Report (PCT/ISA/210) issued in PCT Application No. PCT/EP2024/050365 dated Apr. 17, 2024, with English translation (7 pages).

German-language Written Opinion (PCT/ISA/237) issued in PCT Application No. PCT/EP2024/050365 dated Apr. 17, 2024, with English translation (9 pages).

German-language German Office Action issued in German Application No. 10 2023 000 539.8 dated Dec. 15, 2023 (3 pages).

Zhou et al., "New Family of Argyrodite Thioantimonate Lithium Superionic Conductors", Journal of the American Chemical Society, 2019, vol. 141, pp. 19002-19013 (12 pages).

Lee et al., "Lithium Argyrodite Sulfide Electrolytes with High Ionic Conductivity and Air Stability for All-Solid-State Li-Ion Batteries", ACS Energy Letters, American Chemical Society, Jan. 14, 2022, pp. 171-179, vol. 7, No. 1, XP055924425 (12 pages).

Li et al., "Recent Advances and Perspectives of Air Stable Sulfide-Based Solid Electrolytes for All-Solid-State Lithium Batteries", Chemical Record, Jul. 5, 2022, pp. 1-23, vol. 22, No. 10, XP093147882 (23 pages).

Chinese-language Office Action issued in Chinese Application No. 202480002710.X dated Apr. 12, 2025, with English translation (17 pages).

\* cited by examiner

|  |  |  | Li$_2$S | Sb$_2$S$_3$ | SiS$_2$ | LiCl |
|---|---|---|---|---|---|---|
| Li$_{6+x}$Sb$_{1-y}$Si$_x$S$_5$Cl$_1$ | X=0 |  | 1.181 | 1.456 | 0 | 0.363 |
|  | X=0.1 |  | 1.22 | 1.331 | 0.08 | 0.369 |
| where x = y | X=0.3 |  | 1.301 | 1.069 | 0.249 | 0.381 |
|  | X=0.5 |  | 1.389 | 0.789 | 0.429 | 0.394 |
|  | X=0.6 |  | 1.434 | 0.642 | 0.523 | 0.401 |

FIG. 1A

|  |  |  | Li$_2$S | Sb$_2$S$_3$ | SiS$_2$ | LiBr |
|---|---|---|---|---|---|---|
| Li$_{6+x}$Sb$_{1-y}$Si$_x$S$_5$Br$_1$ | X=0 |  | 1.084 | 1.292 | 0 | 0.66 |
|  | X=0.1 |  | 1.081 | 1.179 | 0.071 | 0.67 |
| where x = y | X=0.3 |  | 1.15 | 0.94 | 0.219 | 0.689 |
|  | X=0.5 |  | 1.22 | 0.694 | 0.377 | 0.71 |
|  | X=0.6 |  | 1.257 | 0.563 | 0.459 | 0.87 |

FIG. 1B

|  |  |  | Li$_2$S | Sb$_2$S$_3$ | WS$_2$ | LiI |
|---|---|---|---|---|---|---|
| Li$_{6+x}$Sb$_{1-y}$W$_x$S$_5$I$_1$ | X=0.05 |  | 0.934 | 1.084 | 0.083 | 0.899 |
|  | X=0.1 |  | 0.931 | 1.015 | 0.165 | 0.889 |
| where x = y | X=0.15 |  | 0.928 | 0.948 | 0.244 | 0.879 |
|  | X=0.2 |  | 0.925 | 0.883 | 0.322 | 0.87 |

FIG. 1C

|  |  |  | Li$_2$S | Sb$_2$S$_3$ | LiCl | LiBr |
|---|---|---|---|---|---|---|
| Li$_{6-x}$Sb$_1$S$_{5-z}$Cl$_1$Br$_z$ | X=0.1 |  | 0.987 | 1.471 | 0.309 | 0.063 |
|  | X=0.2 |  | 0.955 | 1.447 | 0.304 | 0.124 |
| where x = z | X=0.3 |  | 0.923 | 1.424 | 0.299 | 0.184 |
|  | X=0.5 |  | 0.864 | 1.38 | 0.29 | 0.297 |
|  | X=0.7 |  | 0.807 | 1.339 | 0.281 | 0.403 |

FIG. 1D

SULFIDE SOLID ELECTROLYTE FOR SOLID-STATE BATTERIES AND METHOD FOR PRODUCTION

BACKGROUND AND SUMMARY OF THE INVENTION

The invention relates to a sulfide solid electrolyte for solid-state batteries. The invention further relates to a method for producing such a sulfide solid electrolyte.

Different types of batteries for storing electrical power are known. One of these types is the so-called solid-state battery. Solid-state batteries or secondary solid-state batteries contain a solid electrolyte or solid-state electrolyte. In comparison to lithium-ion batteries, for example, solid-state batteries do not contain any fluid or flammable poisonous organic solvent, wherein solid-state batteries have improved safety in comparison to lithium-ion batteries. Solid-state batteries are viewed as prospective batteries of the so-called next generation.

In order to increase the power of solid-state batteries, the solid electrolyte can be modified. The aim is to increase the ionic conductivity, and the stability compared with lithium, which is connected to increased power and to increased safety of solid-state batteries.

For example, solid electrolytes having the fundamental molecular formula $Li_6 P S_5 R$, wherein R can be a halogen, such as chlorine, bromine or iodine, are known. The disadvantage of such classical solid electrolytes is the use of phosphorous. The phosphorous binds oxygen from the air, which can eventually lead to degradation of the sulfide structure. For this reason, it is fundamentally known from the prior art that phosphorous can be replaced by antimony, which prevents reaction with oxygen. Ultimately, an air-stable sulfide solid-state electrolyte can be obtained, for example according to the molecular formula $Li_{6+x} M_x Sb_{1-x} S_5 I$, wherein the (semi-)metal M is typically Si, Ge or Sn. Factor x is in a range of $0.1<x<0.7$. Therefore, only iodine is used as an anion, in order to obtain a crystalline structure of an argyrodite with a space group F43m. A modification of such type is described, for example, in "New Family of Argyrodite Thioantimonate Lithium Superionic Conductors" in the *Journal of the American Chemical Society* from 2019, volume 141, page 19002 to 19013. Antimony, which is larger than phosphorous, also improves the ionic conductivity of the composition.

The structures described therein always comprise iodine as a halogen, and are provided with a (semi-)metal, such as in particular silicon, germanium or tin. Despite the improved resistance to air/oxygen, it is still possible with this new type of phosphorous-free sulfide solid electrolyte that well-equipped solid-state batteries tend to short circuit very quickly and have a low power density or energy density.

The object of the present disclosure is to specify a sulfide solid-state electrolyte for solid-state batteries which combines a power increase compared with known solid-state electrolytes with good manageability of the solid electrolyte.

According to the disclosure, this object may be solved by a solid electrolyte for solid-state batteries having the features recited in the independent claim and here in particular in the composition of the independent claim. Advantageous embodiments and developments result from the dependent claims thereof. Furthermore, a method for producing a solid electrolyte of such type is described. An advantageous development may also result from the dependent claims.

The core of the solid electrolyte according to the disclosure has a composition with the fundamental molecular formula:

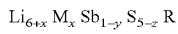

$Li_{6+x} M_x Sb_{1-y} S_{5-z} R$ where x=0 to 0.7; y=0 to 0.7 and z=0 to 0.7, and M=Si, Sn, W and R=$I_1$, $Cl_1$, $Br_z$, $Br_1$.

Therefore, in the case using iodine as a radical R, the (semi-)metal M in each case is tungsten, which is present in the composition in a proportion larger than 0.

A solid electrolyte of such type may make a solid-state battery with higher power, higher power density and simultaneously very high safety possible, since both short circuits as well as the formation of poisonous gases, as in conventional batteries, are prevented.

Advantageously, the sulfide solid electrolyte according to the disclosure comprises a new class of phosphorous-free, sulfide solid electrolytes having a cubic argyrodite structure, and has enhanced chemical and electrochemical properties in comparison to known argyrodite structures.

A very advantageous embodiment of the sulfide solid electrolyte according to the disclosure can therefore provide that the (semi-)metal is silicon or tin, wherein in this case the factor z is then zero, so that five proportions of sulfur are always present. Furthermore, this leads to chlorine or bromine always occurring alone and with a stoichiometry of 1, wherein iodine is already excluded. The factors x and y in this case are identical and are in the range of between 0 and 0.6, so that a variant also exists for a value of 0 that completely dispenses with silicon or tin.

A further very advantageous embodiment of the sulfide solid electrolyte according to the disclosure can provide, as already stated as a special case of the main claim, that the radical, i.e. the halogen, is always iodine. In this case, the metal M according to the independent claim may be tungsten with a stoichiometry of more than 0. The preferred embodiment of this material further provides that the factor z=0, i.e. sulfur, is always present with the stoichiometry 5, and that the factors x and y are identical and are between 0.05-0.2.

This solid electrolyte has a composition including iodine and tungsten, which occurs at the site of the (semi-)metal and, together with the iodine, offers a high ionic conductivity with correspondingly good stability against air, moisture and lithium.

A further very favourable embodiment of a sulfide solid electrolyte according to the disclosure can further provide that this is over-halogenated. In this case, the radical comprises more than one halogen with a common stoichiometry that is greater than 1. In this case, the factor y may be 0, the factors x and z may be identical and may be in a value range of 0.1-0.7. This over-halogenation then results in a drastic increase in ionic conductivity due to expansion of the cubic crystal structure in the solid electrolyte material, especially if the (semi-)metal is completely dispensed with in accordance with a very advantageous further development. The simultaneous use of bromine and chlorine with a common stoichiometry, which is greater than 1, achieves this drastic increase of ionic conductivity by reducing the activation energy for lithium diffusion. The value of the activation energy by over-halogenation can be reduced to below 0.2 eV, while standard values are typically in the order of 0.28 eV and 0.35 eV.

In particular, this over-halogenation leads to a high efficiency and a material that is very stable against environmental conditions, with a very high ionic conductivity.

The method for producing the sulfide solid electrolyte may include the following steps. Initially, the reactants may be mechanically mixed to form a vitreous or amorphous powder mixture. The reactants may comprise, depending on the desired composition:

Lithium sulfide ($Li_2S$);
Antimony(III) or antimony(V) sulfide ($SbS_3$, $Sb_2S_5$), wherein here the two oxidation stages can be applied;
Silicon sulfide ($SiS_2$), tin(IV) sulfide ($SnS_2$) and/or tungsten(IV) sulfide ($WS_2$); and
Lithium chloride (LiCl), lithium bromide (LiBr) and/or lithium iodide (LiI).

In the next step, the amorphous powder mixture may be heated to temperatures of between 470° C.-580° C. in an argon atmosphere for 1-7 days, or the amorphous powder mixture may be heated in a static or dynamic vacuum at temperatures between 400-600° C. for 1-7 days. By heating the vitreous, amorphous powder, a crystalline structure may be obtained from the mixture.

The production of the new solid electrolyte can occur by means of the classical synthetic route. This makes the production of the new solid electrolyte simple and reliable, since the processes are known and can be carried out reliably in existing systems.

A particularly favourable embodiment of the method for producing the new solid electrolyte can also provide that the particle size of the lithium sulfide used is correspondingly small, for example on the order of less than 3 μm. Particularly preferably, the particle size can be smaller than 1 μm. By controlling the particle size of the lithium sulfide as a reactant, the end particle size of the synthesized solid electrolyte can be influenced accordingly. The smaller the particle size of the lithium sulfide, the smaller the particle size of the solid electrolyte. Thus, the mentioned sizes are ideal in order to achieve high stability with good functionality of the solid electrolyte.

Further advantageous embodiments of the solid electrolyte according to the disclosure result from the exemplary embodiments of the material, which is represented in more detail below with reference to the figures.

Here:

BRIEF DESCRIPTION OF THE DRAWINGS

FIGS. 1A-1D show tabular lists of different compositions.

DETAILED DESCRIPTION OF THE DRAWINGS

In the representation of FIGS. 1A-1D, possible compositions of the solid electrolyte for solid-state batteries are represented in four individual tables. The compositions in the tables describe the material available in the first left-hand column, using the formula and the factors x, y, z. In the following column, different values for the factor x are specified, which is the same as the factor y or z for each composition. The further columns show the raw materials from which the material is produced. Therefore, the antimony sulfide here may be listed as an antimony(V) sulfide, but antimony(III) sulfide may also be used; the ratios given below would then have to be adjusted accordingly. The reactant for the (semi-)metal M is silicon sulfide in the tables shown in FIGS. 1A and 1B and tungsten sulfide in the table shown in FIG. 1C. In the table shown in FIG. 1D, no (semi-)metal is required. In the right-hand column, in the three tables of FIGS. 1A-1C, and in the two right-hand columns of the table in FIG. 1D, the respective required lithium halide is provided. The quantities for the individual reactants are to be understood in moles.

For example, a solid electrolyte with the molecular formula $Li_{6.6}Sb_{0.4}Si_{0.6}S_5Cl_1$ according to the last line of the table in FIG. 1A requires 1.434 Mol $Li_2S$; 0.642 Mol $Sb_2S_3$; 0.523 Mol $SiS_2$ and 0.401 Mol LiCl. These starting quantities, which can be adjusted, i.e. increased or decreased in a suitable ratio as required, are mixed together. The mixture of amorphous vitreous powder is then heated, e.g. at 470° C. to 580° C. in an argon atmosphere for 1 to 7 days, in order to obtain the crystalline structure of the solid electrolyte.

For the other compositions, this would occur analogously.

The invention claimed is:

1. A sulfide solid electrolyte for solid-state batteries, the sulfide solid electrolyte comprising:
a phosphorous-free solid electrolyte having a cubic argyrodite structure and a composition according to the molecular formula $Li_{6+x} M_x Sb_{1-y} S_{5-z} R$,
wherein 0<x≤0.7, y=0 to 0.7, and z=0 to 0.7,
wherein M is selected from the group consisting of Si and Sn, and wherein R is selected from the group consisting of $Cl_1$ and $Br_1$.

2. The sulfide solid electrolyte according to claim 1, wherein z=0 and x=y, where 0<x≤0.6.

3. A method for producing a solid electrolyte according to claim 1, the method comprising:
mixing the reactants:
$Li_2S$, and
$SbS_3$ or $Sb_2S_5$, and
$SiS_2$ and/or $SnS_2$, and
LiCl and/or LiBr
into a vitreous amorphous powder mixture;
heating the amorphous powder mixture to a temperature between 470° C.-580° C. in an argon atmosphere, or heating the amorphous powder mixture in a static or dynamic vacuum at a temperature between 400-600° C., each for 1-7 days,
thereby producing the phosphorous-free solid electrolyte.

4. The method according to claim 3, wherein the $Li_2S$ used in the powder mixture has a particle size of less than 3 μm.

* * * * *